United States Patent
Mimura

[11] Patent Number: 5,897,453
[45] Date of Patent: Apr. 27, 1999

[54] DIFFERENTIAL GEAR

[76] Inventor: Kenji Mimura, 29-1105, Wakabadai 4-Chome, Asahi-ku, Yokohama-shi, Kanagawa, 241, Japan

[21] Appl. No.: 08/839,833

[22] Filed: Apr. 17, 1997

[30]    Foreign Application Priority Data

Apr. 17, 1996  [JP]  Japan .................................... 8-095243

[51] Int. Cl.⁶ ..................................................... B60K 17/16
[52] U.S. Cl. ........................... 475/246; 475/230; 384/623
[58] Field of Search ..................................... 475/246, 245, 475/230, 231, 196, 243, 253; 384/621, 623

[56]            References Cited

U.S. PATENT DOCUMENTS

| | | | |
|---|---|---|---|
| 1,494,392 | 5/1924 | Van Loozen ............................ | 384/623 |
| 4,042,285 | 8/1977 | Dorsch ................................... | 384/621 |
| 4,077,683 | 3/1978 | Bhateja et al. ......................... | 384/623 |
| 4,269,086 | 5/1981 | Altmann ................................. | 475/231 |
| 5,059,160 | 10/1991 | Raniero .................................. | 475/234 |
| 5,234,388 | 8/1993 | Nordkvist .............................. | 475/246 |
| 5,312,306 | 5/1994 | Folino ................................... | 475/196 |
| 5,514,045 | 5/1996 | Folino ................................. | 475/196 X |
| 5,533,424 | 7/1996 | Mimura ............................. | 475/231 X |
| 5,577,423 | 11/1996 | Mimura . | |
| 5,582,557 | 12/1996 | Dissett et al. .......................... | 475/231 |

*Primary Examiner*—Dirk Wright
*Assistant Examiner*—Peter T. Kwon
*Attorney, Agent, or Firm*—Lowe Hauptman Gopstein Gilman & Berner

[57]            ABSTRACT

The present invention provides a differential gear capable of constantly ensuring a stable differential motion restricting force even in the case of a low rotational speed. In the present invention, when there occurs a difference in rotational speed between output side rotary elements, rollers are allowed to roll while being in contact with the confronting faces of the input side and output side rotary elements. The rollers move along rotational trajectories of the output side rotary elements while being restricted by a holder element from rolling toward the direction inclined by a predetermined angle relative to the rotational trajectories of the output side rotary elements. Thus, there occurs a frictional force between the rollers and the contact faces therewith, which results in a resistance to restrict the differential motion, At that time, the rollers generate a sliding friction in the course of rolling, thereby always ensuring a stable frictional force based on a dynamic friction even at a low rotational speed.

6 Claims, 13 Drawing Sheets

DIFFERENTIAL GEAR

BACKGROUND OF THE INVENTION

1. Field of the Invention

The present invention relates generally to a differential gear permitting a difference in rotational speed between right and left or front and rear driving wheels of a motor vehicle.

2. Description of the Prior Art

Conventional automotive differential gears are commonly of a type in which a pinion gear intervenes between a pair of bevel gears coupled to output shafts and the pinion gear is rotated upon a differential motion which may be caused by an application of external rotational force to the pinion gear shaft, to thereby permit the difference in rotational speed between the output shafts. Another type of differential gears are also known which have a differential motion restricting function for restraining one of the driving wheels from idling at the time of turning or during the traveling on the surface of road having a low frictional coefficient and in which a multiple disk clutch is disposed on the back side of the bevel gear and is pressed by a thrust force of the bevel gear to generate a frictional force, thereby achieving the transmission of a driving force.

For mechanisms such as a multiple disk clutch making use of sliding friction for power transmission, however, it was extremely difficult to limit the frictional force in a half-coupled state to a certain value. At the lower rotational speed, in particular, the differential motion restricting force has disadvantageously suffered from significant instability including an occurrence of so-called stick slip, that is, intermittent generation of static friction and dynamic friction on a clutch-to-clutch basis. Furthermore, an unstable frictional force will result in the generation of noise and vibration, which may adversely affect the running properties.

SUMMARY OF THE INVENTION

The present invention was conceived in view of the above problems. It is therefore the object of the present invention to provide a differential gear constantly ensuring a stable differential motion restricting force even at a lower rotational speed.

According to a first aspect of the present invention, in order to accomplish the above object, there is provided a differential gear having an input side rotary element to be rotated by an external driving force, a pair of output side rotary elements arranged coaxially with the input side rotary element, and transmission means for transmitting the rotational force of the input side rotary element to the output side rotary elements while permitting a difference in rotational speed between the different output side rotary elements. The differential gear comprises a plurality of rollers, interposed between axially confronting faces of the input side rotary element and at least one of the pair of output side rotary elements. The plurality of rollers, when there occurs a difference in rotational speed between the pair of output side rotary elements are allowed to roll while being in contact with the confronting faces of the input and output side rotary elements. There is also provided a roller holder for holding the plurality of rollers in a freely rolling manner along a predetermined circumference at predetermined intervals around the rotational axes of the input side and output side rotary elements. The rolling axes of the rollers are inclined at predetermined angles relative to a plane including the rotational axes of the input side and output side rotary elements.

According to a second aspect of the present invention, there is provided a differential gear having an input side rotary element to be rotated by an external driving force, a pair of output side rotary elements arranged coaxially with the input side rotary element, a plurality of rolling elements interposed between axially confronting faces of the output side rotary elements, and a holder element for holding the rolling elements between the output side rotary elements, wherein the holder element has a plurality of elongated holes extending in the radial direction of the output side rotary elements and extends therethrough in the axial direction of the output side rotary elements. The plurality of elongated holes are adapted to movably receive the rolling elements. The axially confronting faces of the output side rotary elements are provided with grooves with which the rolling elements are engaged, the grooves being continuous with each other in the circumferential direction of the output side rotary elements. The differential gear further comprises a plurality of rollers interposed between axially confronting faces of the input side rotary element and at least one of the pair of output side rotary elements. The plurality of rollers, when there occurs a difference in rotational speed between the pair of output side rotary elements are allowed to roll while being in contact with the confronting faces of the input and output side rotary elements, there is further provided a roller holder for holding the plurality of rollers in a freely rolling manner at predetermined intervals along a predetermined circumference around the rotational axes of the input side and output side rotary elements, wherein rolling axes of the rollers are inclined by predetermined angles relative to a plane including the rotational axes of the input side and output side rotary elements.

According to a third aspect of the present invention, there is provided a differential gear having an input side rotary element to be rotated by an external driving force, a pair of output side rotary elements arranged coaxially with the input side rotary element, a plurality of rolling elements interposed between radially confronting faces of the input side rotary element and the output side rotary elements, and a holder element, arranged to be axially movable between the radially confronting faces of the input side rotary element and the output side rotary elements, for holding, in a freely rolling manner, the rolling elements disposed in the axial direction of the output side rotary elements, the input side rotary element having a plurality of elongated holes extending in the axial direction of the output side rotary elements, the rolling elements movably engaging the plurality of elongated holes, the confronting faces of the output side rotary elements and the input side rotary element being provided with grooves with which the rolling elements are engaged, and which are continuous with each other in the circumferential direction of the output side rotary elements, the differential gear comprising a plurality of rollers interposed between axially confronting faces of the input side rotary element and the pair of output side rotary elements and between axially confronting faces of the output side rotary elements, the plurality of rollers when there occurs a difference in rotational speed between the pair of output side rotary elements being allowed to roll while being in contact with the confronting faces of the input and output side rotary elements and with the confronting faces of the output side rotary elements; and a roller holder for holding the plurality of rollers at predetermined intervals in a freely rolling manner along a predetermined circumference around the rotational axes of the input side and output side rotary elements; wherein rolling axes of the rollers are inclined by predetermined angles relative to a plane including rotational axes of the input side and output side rotary elements.

In the above differential gear, when there occurs a difference in rotational speed between the output side rotary elements, the rollers are allowed to roll while being in contact with the confronting faces of the input side and output side rotary elements, and move along the rotational trajectories of the output side rotary elements while being restricted by the holder from rolling to the direction inclined at a predetermined angle relative to the rotational trajectories of the output side rotary elements. Thus, there is generated a frictional force between the rollers and the surfaces in contact therewith, that results in a resistance to restrict the differential motions. At that time, the rollers generate a sliding frictional force in the course of rolling, so that it becomes possible to constantly obtain a stable frictional force even at a lower rotational speed, ensuring a secure prevention of noise and vibration. In addition, by setting the inclination angles of the rollers to arbitrary values, the frictional force can be varied in magnitude to obtain a desired differential motion restricting force.

In the differential gear set forth hereinabove, the plurality of rollers are preferably arranged in a freely inclined manner so that an angle formed, when there occurs a difference in rotational speed between the output side rotary elements in one direction of rotation, between the rolling axes of the rollers and a plane including the rotational axes of the input side and output side rotary elements, are different from an angle formed, when there occurs a difference in rotational speed between the output side rotary elements in the other direction of rotation, between the rolling axes of the rollers and the plane including rotational axes of the input side and output side rotary elements. Thus, different inclination angles of the rollers will lead to different magnitudes of frictional force, making it possible to increase the differential motion restricting force when in one rotational direction there occurs a difference in rotational speed between the output side rotary elements but to reduce the differential motion restricting force when it occurs in the other rotational direction.

BRIEF DESCRIPTION OF THE DRAWINGS

The above and other objects, aspects, features and advantages of the present invention will become more apparent from the following detailed description with reference to the accompanying drawings, in which.

DESCRIPTION OF THE PREFERRED EMBODIMENT

Figure 1:
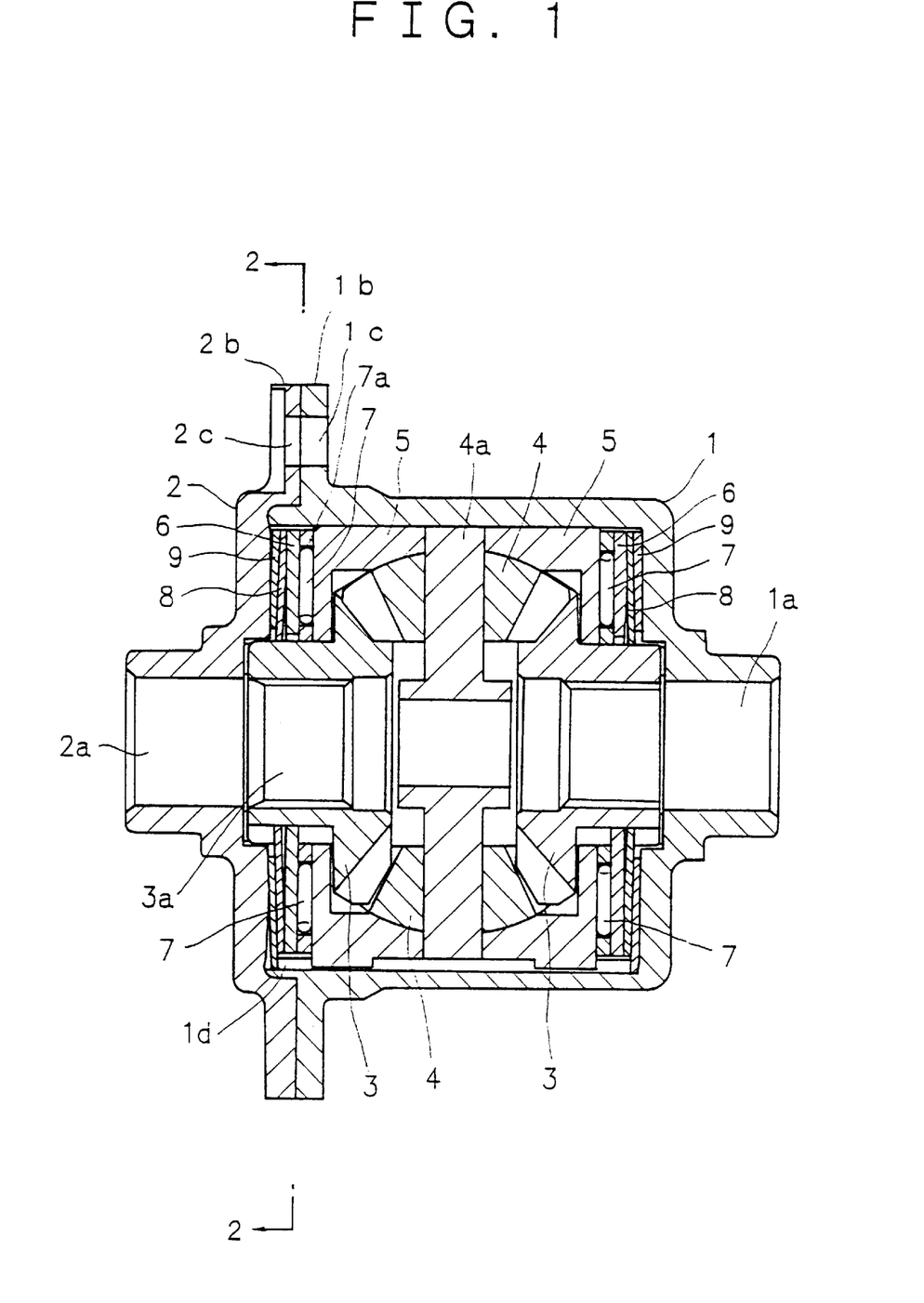
FIG. 1 is a side sectional view of a differential gear showing a first embodiment of the present invention.
Figure 2:
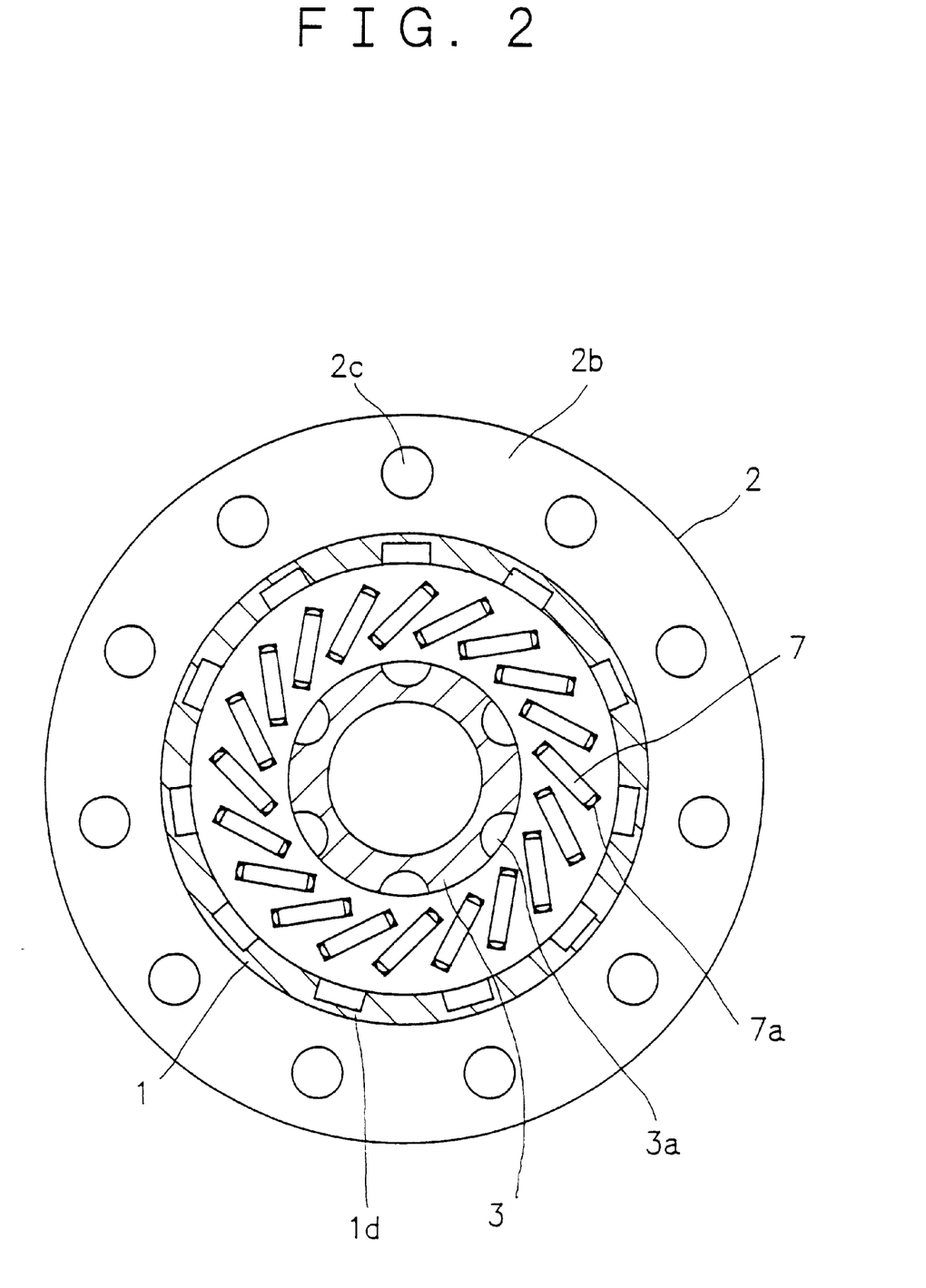
FIG. 2 is a sectional view taken along a line 2—2 of FIG. 1 and viewed from the direction of the arrow.
Figure 3:
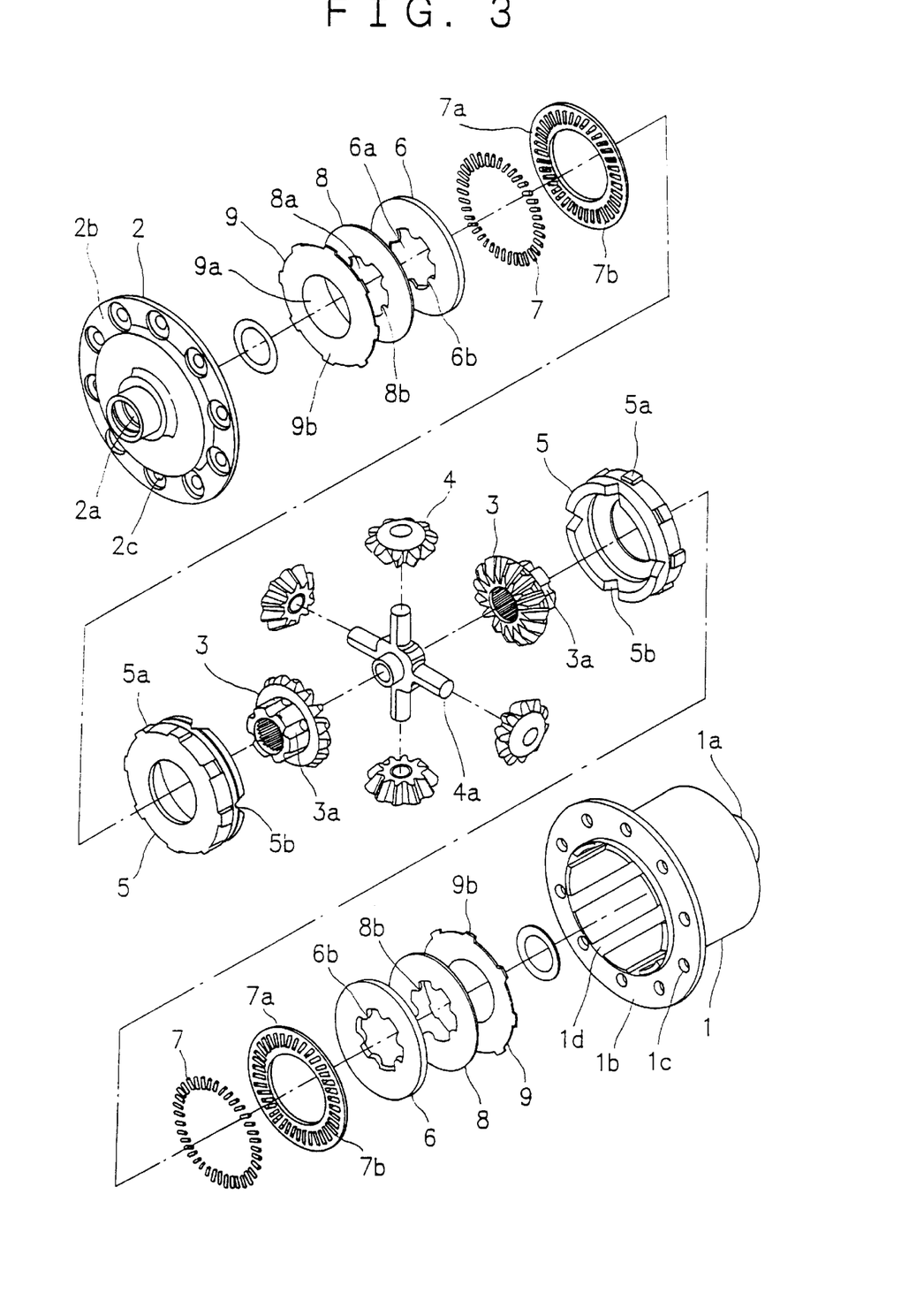
FIG. 3 is an exploded perspective view of the differential gear.

A differential gear of this embodiment comprises a gear case 1, a gear case cover 2 serving to close one end of the gear case 1, a pair of bevel gears 3 arranged coaxially and confronting each other, a total of four pinion gears 4 interposed between the bevel gears 3, a pair of pressure rings 5 confronting each other with the bevel gears interposed, a pair of pressure plates 6 facing the back side of the pressure rings 5, a multiplicity of rollers 7 arranged between the pressure rings 5 and the pressure plates 6, and disk springs 8, 9 for urging the pressure plates 6 toward the pressure rings 5. An input side rotary element is constituted of the gear case 1, the gear case cover 2 and the pressure rings 5, whereas an output side rotary element is constituted of the bevel gears 3.

The gear case 1 is of a tubular form having an open end and is provided at its center with a bearing 1a for supporting one of the bevel gears 3. Around the gear case 1 is provided a flange 1b which has a multiplicity of holes 1c for the insertion of bolts. A multiplicity of axially extending grooves 1d are formed in the inner surface of the gear case 1 in a circumferentially spaced apart relationship.

The gear case cover 2 is of a disk-like form and has provided at its center a bearing 2a for supporting the other of the bevel gears 3. Around the gear case cover 2 is provided a flange 2b which has a multiplicity of holes 2c for the insertion of bolts. That is, the gear case cover 2 is mounted to the gear case 1 by means of the bolts (not shown) for fastening the flanges 1b and 2b together.

The bevel gears 3 are arranged in such a manner as to allow their respective toothed sides to confront each other and are adapted to be linked with a drive shaft not shown on the wheel side. A multiplicity of axially extending grooves 3a are formed in the back side of the bevel gears 3 in a circumferentially spaced apart relationship.

The pinion gears 4 are rotatably supported on pinion shafts 4a having longitudinal axes orthogonal to each other and are engaged with the bevel gears 3.

Figure 5:
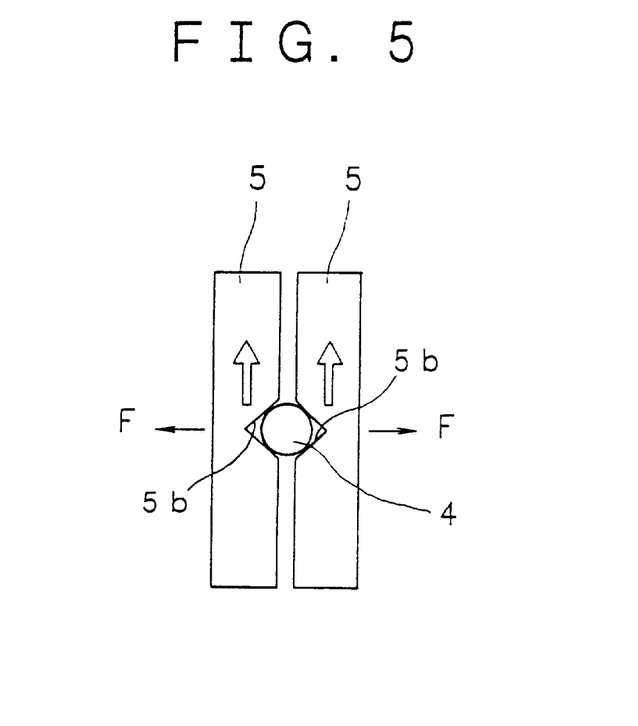
FIG. 5 is an explanatory diagram of operation of the differential gear.

The pressure rings 5 are so formed as to cover the bevel gears 3 and the pinion gears 4 from both ends in the axial direction, and have on their outer peripheral surfaces a multiplicity of projections 5a spaced circumferentially apart from one another and intended to be fitted into the grooves 1d of the gear case 1. The confronting faces of the pressure rings 5 are each provided with a total of four V-shaped grooves 5b which are spaced circumferentially apart from one another. As shown in FIG. 5, the pinion shaft 4a is received in the complementary grooves 5b of the pressure rings 5.

The pressure plates 6 are each provided with a hole 6a which extends through the back side of the bevel gear 3 and which has an inner periphery provided with a multiplicity of protrusions 6b spaced circumerentially apart from one another and intended to be fitted into the grooves 3a of the bevel gear 3.

Figure 4A:
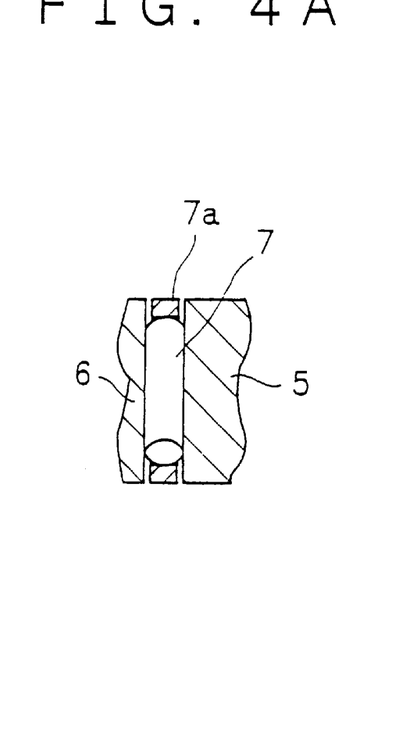
FIGS. 4A and 4B are enlarged views of major parts of the differential gear.
Figure 4B:
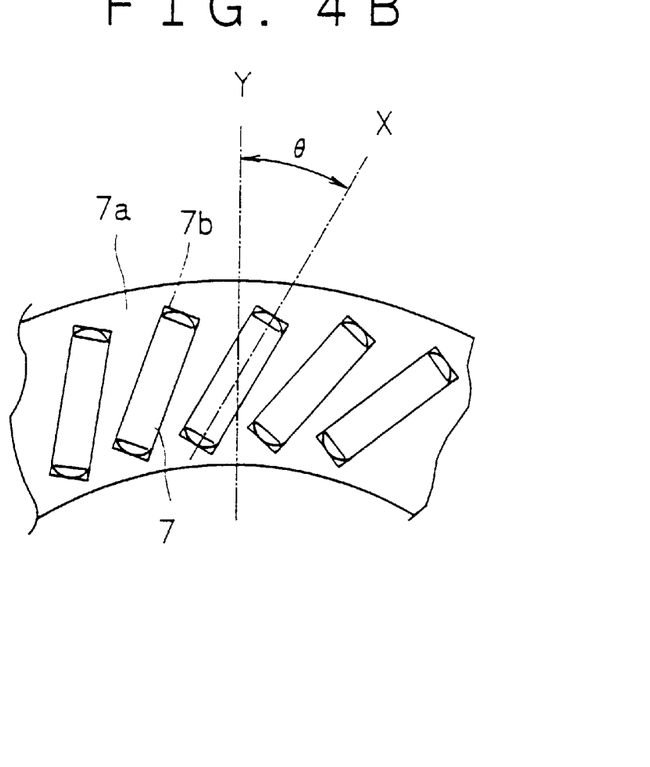

As shown in FIGS. 4A, 4B, the rollers 7 are each of a cylindrical form extending uniformly in the axial direction and are each held by an annular cage 7a at certain intervals in the circumferential direction. The cage 7a has a multiplicity of holes 7b for receiving the rollers 7 in such a manner as to allow their free rolling, the holes 7b as shown in FIG. 4B are provided in such a manner that rolling axes X of the rollers 7 are inclined by an angle theta relative to a plane including the rotational axis of the gear body, in other words, a line Y extending from the rotational center of the gear body.

The disk springs 8, 9 are provided with holes 8a, 9a extending through the back side of the bevel gear 3, the hole 8a of the disk spring 8 on one hand having on its inner periphery a multiplicity of protrusions 8b intended to be fitted into the grooves 3a of the bevel gear 3, the disk spring 9 on the other hand having on its outer periphery a multiplicity of protrusions 9b intended to be fitted into the grooves 1d of the gear case 1.

In the thus constructed differential gear, a ring gear (not shown) is attached to the flange 1b of the gear case 1 for the transmission of the driving force from an engine, thereby allowing the entire gear to rotate around the axis of the gear case 1. More specifically, when a driving force is inputted to the gear case 1, the driving force is transmitted from the gear case 1 to the pressure rings 5. The driving force transmitted to the pressure rings 5 is then delivered through the grooves 5b of the pressure rings 5 to the pinion shafts 4a, and further through the pinion gears 4 to the bevel gears 3.

Figure 6:
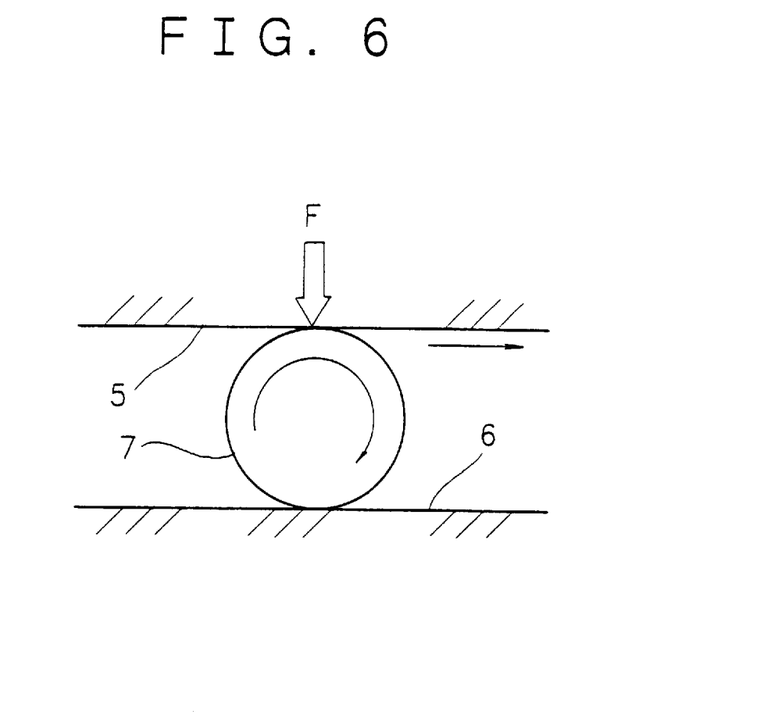
FIG. 6 is an explanatory diagram of operation showing a principle of generation of a frictional force.
Figure 7:
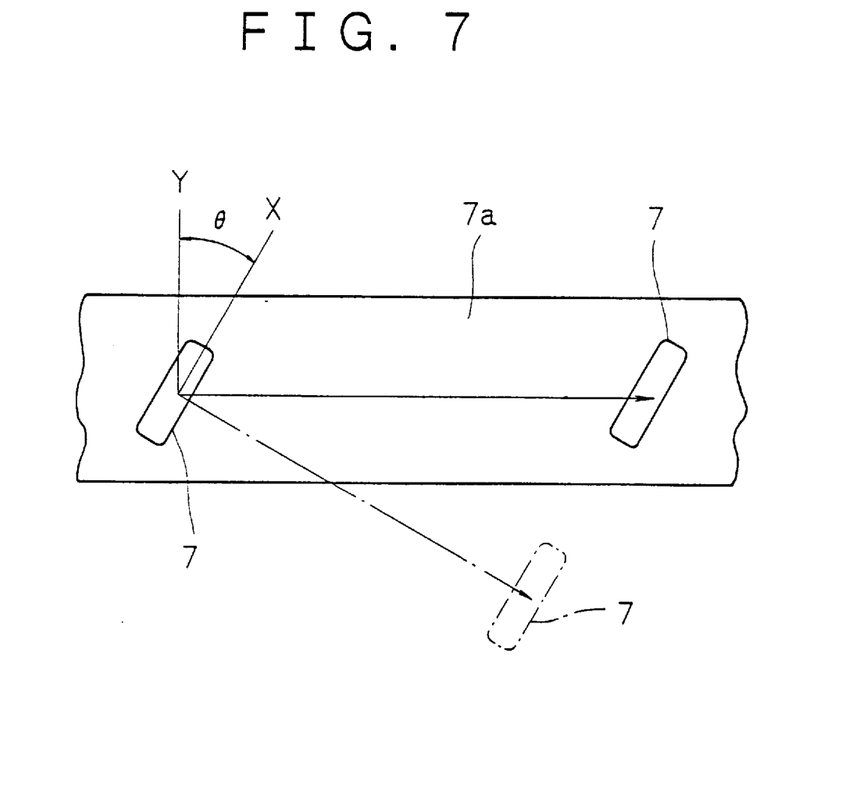
FIG. 7 is an explanatory diagram of operation showing a principle of generation of a frictional force.

Then, if a difference in rotational speed occurs between the bevel gears 3, the pinion gears 4 rotate to achieve differential motions between the bevel gears 3. At that time, the pressure plates 6 and the disk spring 8 on one hand rotate together respectively with the bevel gears 3, whereas the disk spring 9 on the other hand rotates together with the gear case 1. As shown in FIG. 5, due to the inclination of the contact faces of the grooves 5b of the pressure rings 5 with the pinion shaft 4a relative to the input direction of the driving force, when the driving force input to the gear case 1 is transmitted to the pressure rings 5, a thrust force F will be generated as a result of the pressure ring 5 being urged to move in the direction of the rotational axis. Thus, as shown in FIG. 6, the rollers 7 roll while being in pressure contact with both the pressure rings 5 and the pressure plate 6, which is followed by the rotation of the cage 7a. As shown in FIG. 7, at that time, the rollers 7 move along the rotational trajectory (direction indicated by a solid line) of the pressure plate 6 while being restricted by the cage 7a from rolling in the direction (the direction indicated by a chain dotted line) inclined by an angle theta relative to the rotational trajectory of the pressure plate 6, so that there occurs a frictional force corresponding to the thrust force F among the rollers 7 and the pressure ring 5 and the pressure plate 6. The frictional force serves as a resistance to restrict the differential motions between the bevel gears 3. In this case, since the rollers generate sliding friction while rolling, there is always obtained a stable frictional force arising from the dynamic friction, thereby ensuring that an instantaneous migration to the dynamic friction is achieved due to rolling of the rolls 7 even though static friction occurs at the initial stage. The rollers 7 are subjected also to a load from a pilot pressure of the disk springs 8, 9 in addition to the thrust force F.

According to the differential gear of this embodiment in this manner, a multiplicity of rollers 7 are caused to roll while being brought into pressure contact with the pressure ring 5 and the pressure plate 6 by the thrust force of the bevel gears 3. The axes of rolling of the rollers 7 are inclined at a predetermined angle, relative to a plane including rotational axes of the bevel gears 3, to thereby generate a differential motion restricting force by the sliding friction accompanied by the rolling of the rollers 7, thus always ensuring an acquisition of a stable differential motion restricting force as well as securely preventing the generation of noise and vibration. Also, by setting the inclination angle theta of the rollers to an arbitrary angle to vary the magnitude of the frictional force, it is possible to obtain a desired differential motion restricting force.

Figure 8:
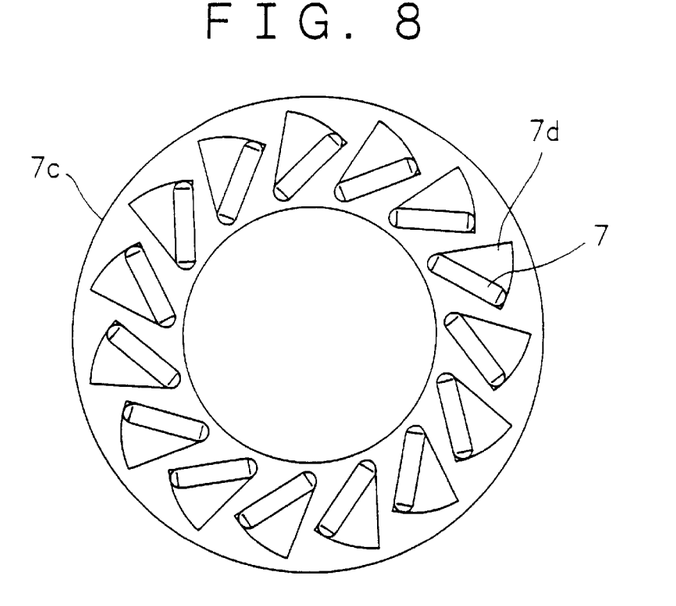
FIG. 8 is a front elevational view of a major part showing a variant of the first embodiment.
Figure 9A:
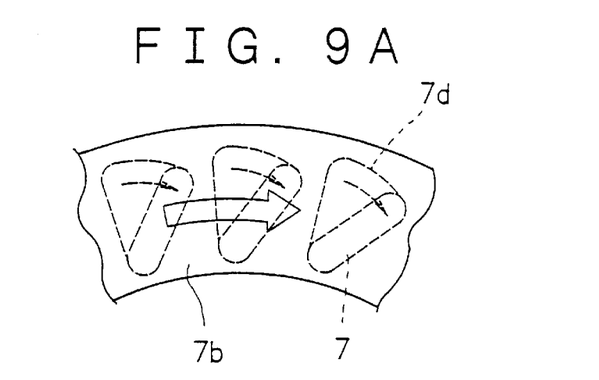
FIGS. 9A and 9B are explanatory diagrams of operation of rollers.
Figure 9B:
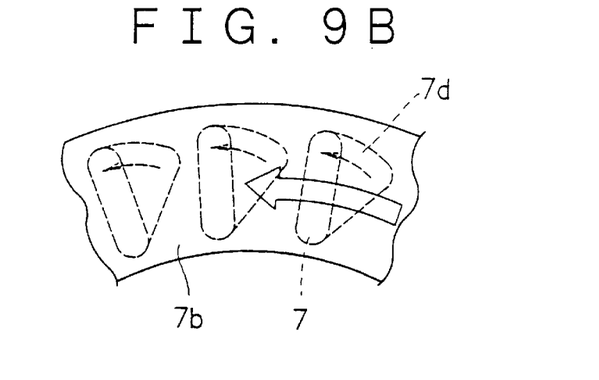

FIGS. 8 and 9A, 9B illustrate a variant of the above embodiment, in which the rollers 7 are provided in a freely inclined manner. That is, a cage 7c, shown in FIGS. 8 and 9A, 9B, has a multiplicity of holes 7d for receiving the rollers 7 so as to allow free rolling. The holes 7d being fan-shaped starting from one end side of the roller 7, with both edges extending from the one end are inclined at different angles relative to the plane that includes the rotational axis of the gear body.

In the above construction, if there occurs a difference in rotational speed between the pressure ring 5 and the pressure plate 6 in one of the rotational directions as shown in FIG. 9A, then the rollers 7 become tilted toward the one end of the cage 7c. If there occurs a difference in rotational speed between the pressure ring 5 and the pressure plate 6 in the other of the rotational directions as shown in FIG. 9B, then the rollers 7 become tilted toward the other end of the cage 7c. At that time, the inclination angles of the rollers 7 differ depending on the rotational directions of the pressure ring 5 and the pressure plate 6, so that different frictional forces will occur depending on their respective angles of inclination. It is therefore possible to increase the differential motion restricting force when the differential motion of the bevel gears 3 occurs in the one rotational direction, but to decrease the force when it occurs in the other rotational direction, which will be advantageous to the mechanism requiring such operations.

Although a thrust force has been generated by means of the pressure rings 5 in the above embodiment, the present invention is also applicable to a construction having no pressure rings 5 since the thrust force is also generated between the toothed faces of the bevel gears 3 and the pinion gears 4.

Figure 10:
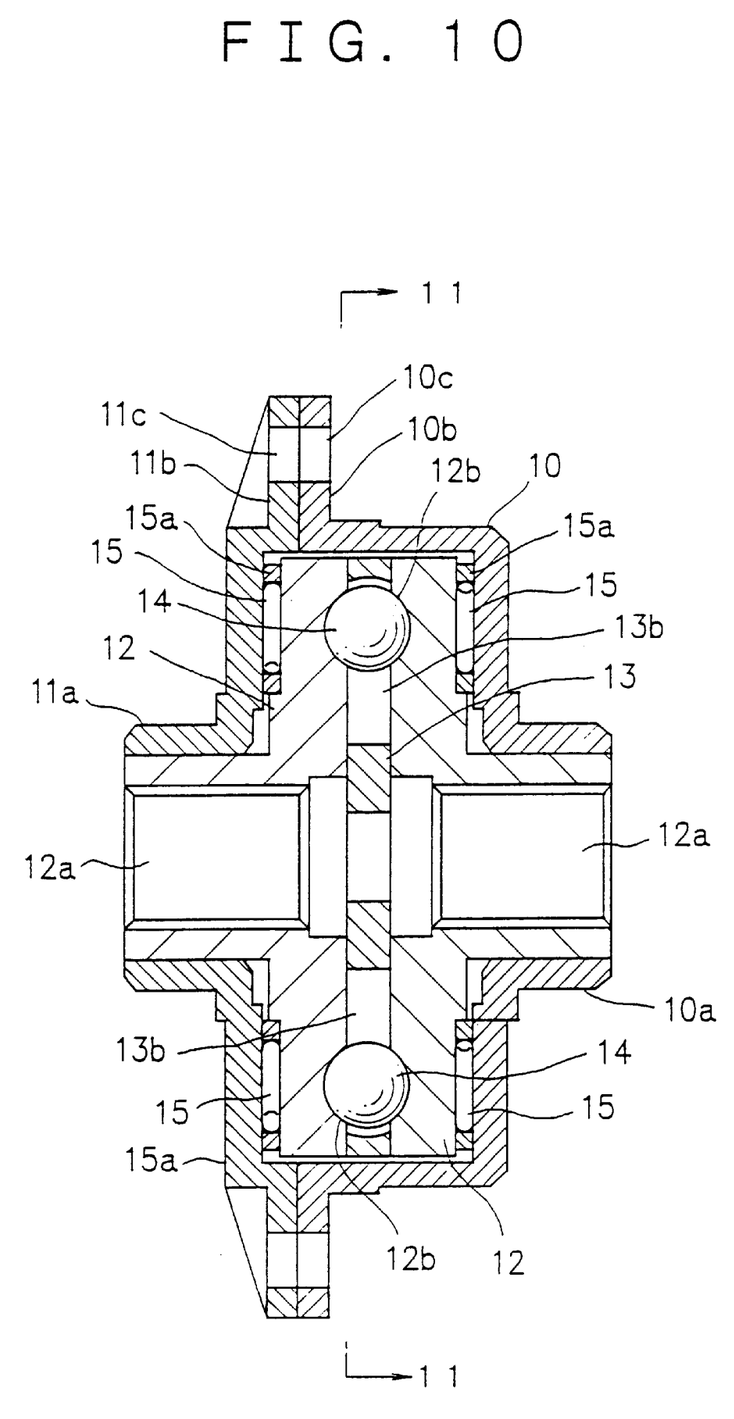
FIG. 10 is a side sectional view of a differential gear showing a second embodiment of the present invention.
Figure 11:
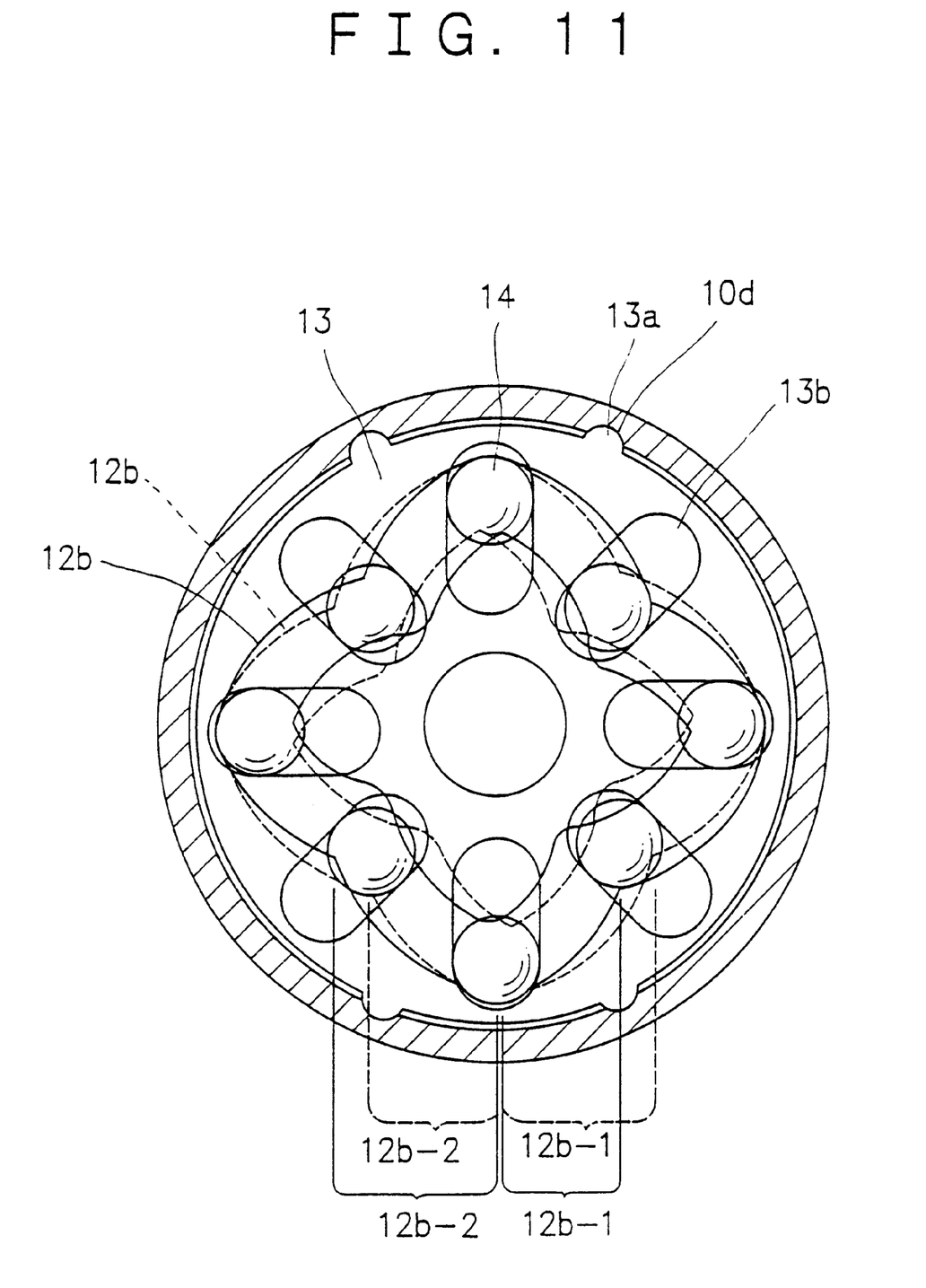
FIG. 11 is a sectional view taken along a line 11—11 of FIG. 10 and viewed from the direction of the arrow.
Figure 12:
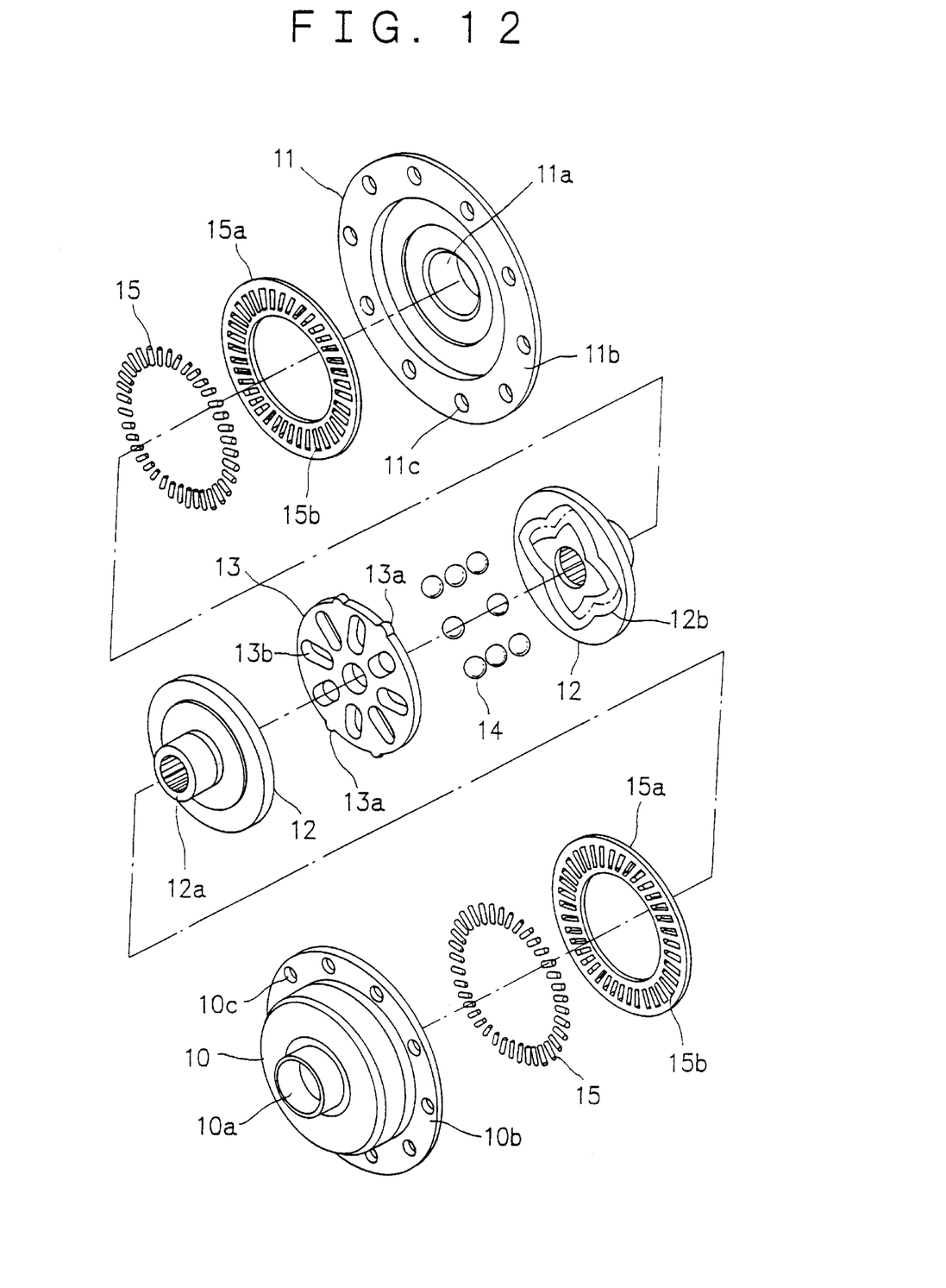
FIG. 12 is an exploded perspective view of the differential gear.

FIGS. 10 to 12 illustrate a second embodiment of the present invention, FIG. 10 being a side sectional view of the differential gear, FIG. 11 being a sectional view taken along a line 11—11 of FIG. 10 and viewed from the direction of arrow, and FIG. 12 being an exploded perspective view of the differential gear.

This differential gear comprises a gear case 10, a gear case cover 11, serving to close one end of the gear case 10, a pair of disk plates 12 coaxially confronting each other, a center plate 13 interposed between the disk plates 12, a multiplicity of balls 14 held by the center plate so as to allow free rolling, and a multiplicity of rollers 15 arranged on the back side of the disk plates 12. An input side rotary element is constituted of the gear case 10, the gear case cover 11 and the center plate 13. An output side rotary element is constituted of the disk plates 12.

The gear case 10 is of a tubular form having one open end and is provided at its center with a bearing 10a for supporting one of the disk plates 12. Around the gear case 10 there is provided a flange 10b that has a multiplicity of holes 10c for the insertion of bolts. The inner surface of the gear case 10 is provided with a groove 10d for securing the center plate 13.

The gear case cover 11 is in the shape of a disk having at its center a bearing 11a for supporting the other of the disk plates 12. Around the gear case cover 11 there is formed a flange 11b which has a multiplicity of holes 11c for the insertion of bolts. That is, the gear case cover 11 is mounted to the gear case 10 by means of bolts, not shown, for fastening the flanges 10b and 11b together.

The disk plates 12 have their respective flat confronting faces, the other end thereof being provided with a coupling portion 12a for coupling a drive shaft not shown on the wheel side. The confronting faces of the disk plates 12 are provided with grooves 12b with which balls 14 are engaged in such manner as to allow a free rolling, the grooves 12b being formed continuously in the circumferential direction. As shown in FIG. 11, the grooves 12b each have a first guide segment 12b-1, in which the balls 14 are moved from the radially inner side of the disk plate 12 toward the outer side, and a second guide segment 12b-2, in which the balls 14 are moved from the radially outer side toward the inner side of the disk plate 12, the first and second guide segments being continuous in the circumferential direction. In the disk plate 12 on one hand, the first guide segment 12b-1 has a circumferential length greater than that of the second guide segment 12b-2, whereas in the disk plate 12 on the other hand, the second guide segment 12b-2 has a circumferential length that is greater than that of the first guide segment 12b-1. That is, the arrangement of the confronting faces of the disk plates 12 is such that when the positions where the balls 14 are reversed coincide with each other on one side (outer side shown in the diagram) of the grooves 12b as shown in FIG. 11, then they are circumferentially shifted from each other on the other side (inner side shown in the diagram).

The center plate 13 has flat end faces and a peripheral surface provided with a projection 13a intended to be fitted into the groove 10d, formed in the inner peripheral surface of the gear case 10, to thereby secure the center plate 13 to the interior of the gear case 10. The center plate 13 has a multiplicity of elongated holes 13b which are spaced circumferentially equally apart from each other and which are intended to receive the balls 14 in such a manner as to allow the balls 14 to freely roll, the elongated holes 13 rectilinearly extending in the radial direction and passing therethrough in the axial direction.

The balls 14 are received within the elongated holes 13b of the center plate 13 and are engaged with the grooves 12b of the disk plates 12.

The rollers 15 are each in the form of a cylinder which extends uniformly in the axial direction and are retained by an annular cage 15a at certain intervals in the circumferential direction. The cage 15a has a multiplicity of holes 15b for receiving the rollers 15 in such a manner as to allow the rollers 15 to freely roll. Similar to the first embodiment, the holes 15b are so arranged that the rolling axes of the rollers 15 are inclined at predetermined angles relative to a plane including the rotational axis of the gear body.

In the thus constructed differential gear, a ring gear, not shown, is attached to the flange 10b of the gear case 10 for transmitting a driving force from an engine so as to allow the entire gear to rotate around the axis of the gear case 10. More specifically, when a driving force is applied to the gear case 10, the center plate 13 is rotated together with the gear case 10, with the resulting rotational force being transmitted through the balls 14 to the grooves 12b of the disk plates 12, and further to the drive shafts, not shown, coupled to the disk plates 12.

Then, when there occurs a difference in rotational speed between the disk plates, the balls 14, within the elongated holes 13b, are guided by the grooves 12b and roll to reciprocate along the associated elongated holes 13b. More specifically, the balls 14 lying on the radially outer side as shown in FIG. 11 are moved toward the radially inner side along the first guide segments 12b-1 of the grooves 12b and after having reached the inner reversing points they are moved toward the radially outer side along the second guide segments 12b-2 of the grooves 12b. In this case, as shown in FIG. 11, every other ball 14, that is half of all the balls 14, is allowed to reach the outer reversing points of the grooves 12b although the remaining half of the balls 14 are not allowed to reach the inner reversing points since the arrangement of the confronting faces is such that when either the inner or outer reversing points of the grooves 12b coincide with each other, the remaining reversing points are shifted from each other. That is, when the balls 14 reach the reversing points of the grooves 12b, force is not transmitted between the balls 14 and the grooves 12b, so that it must be prevented that all the balls 14 reach the reversing points of the grooves 12b at the same time. Also, when the driving force applied to the gear case 10 is transmitted to the disk plates 12, reaction forces will act on the contact surfaces of the grooves 12b of the disk plates 12 with the balls 14, urging the disk plates 12 toward the rotational axes, which results in the generation of thrust force. This will allow the rollers 15 to roll while being brought into pressure contact with the end faces of the disk plate 12 on one hand and the gear case 10, and with the end faces of the disk plate 12 on the other hand and the gear case cover 11. Thus, in the same manner as the first embodiment, the rollers 15 generate frictional forces in proportion to the thrust forces, which serve as a resistance to restrict the differential motion of the disk plates 12.

It is also to be appreciated in this embodiment, like the variant of the first embodiment, that the rollers 15 may be disposed in a freely inclined manner so as to increase the differential motion restricting force when a differential motion between the disk plates 12 occurs in one rotational direction, but to reduce the differential motion restricting force when it occurs in the other rotational direction.

Figure 13:
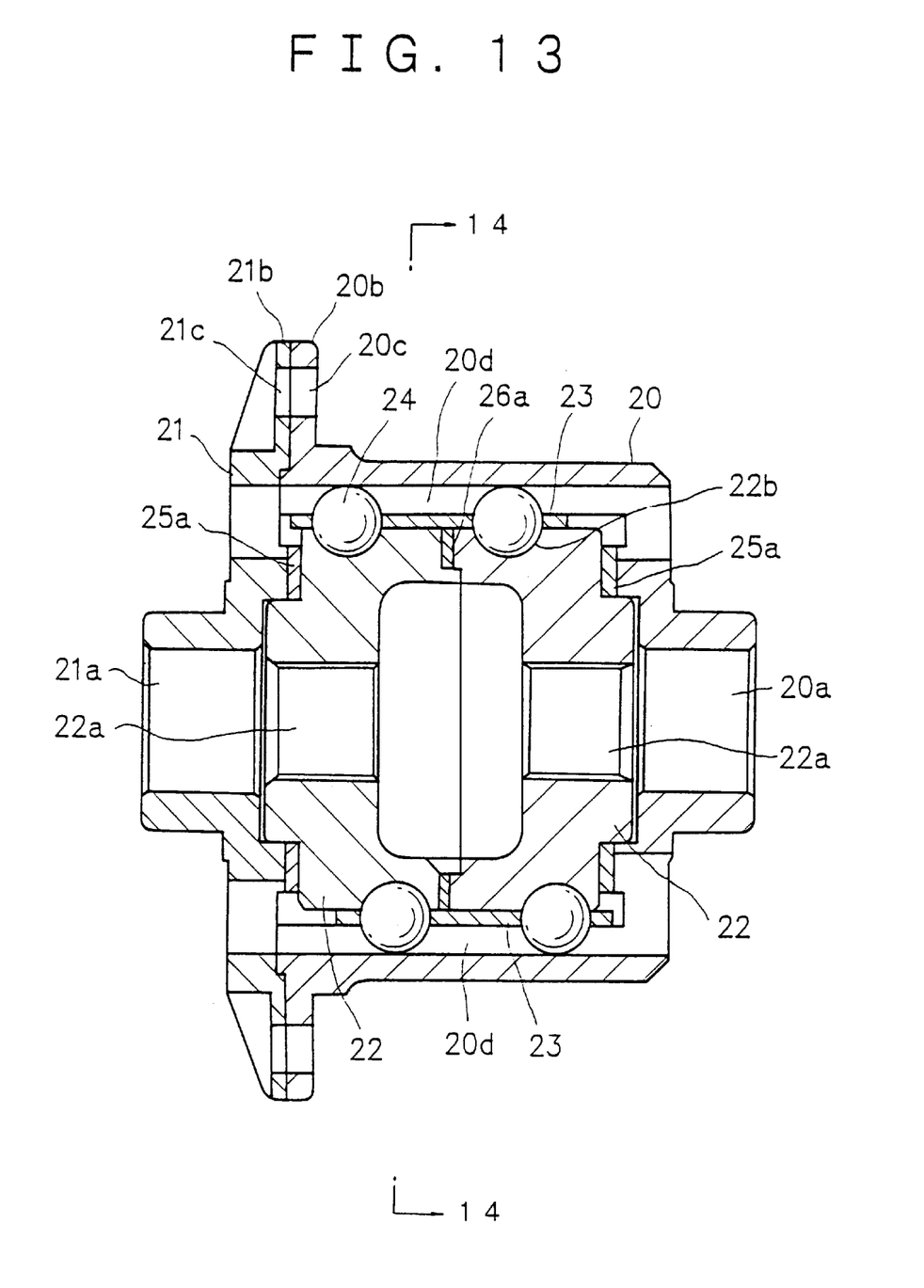
FIG. 13 is a side sectional view of a differential gear showing a third embodiment of the present invention.
Figure 14:
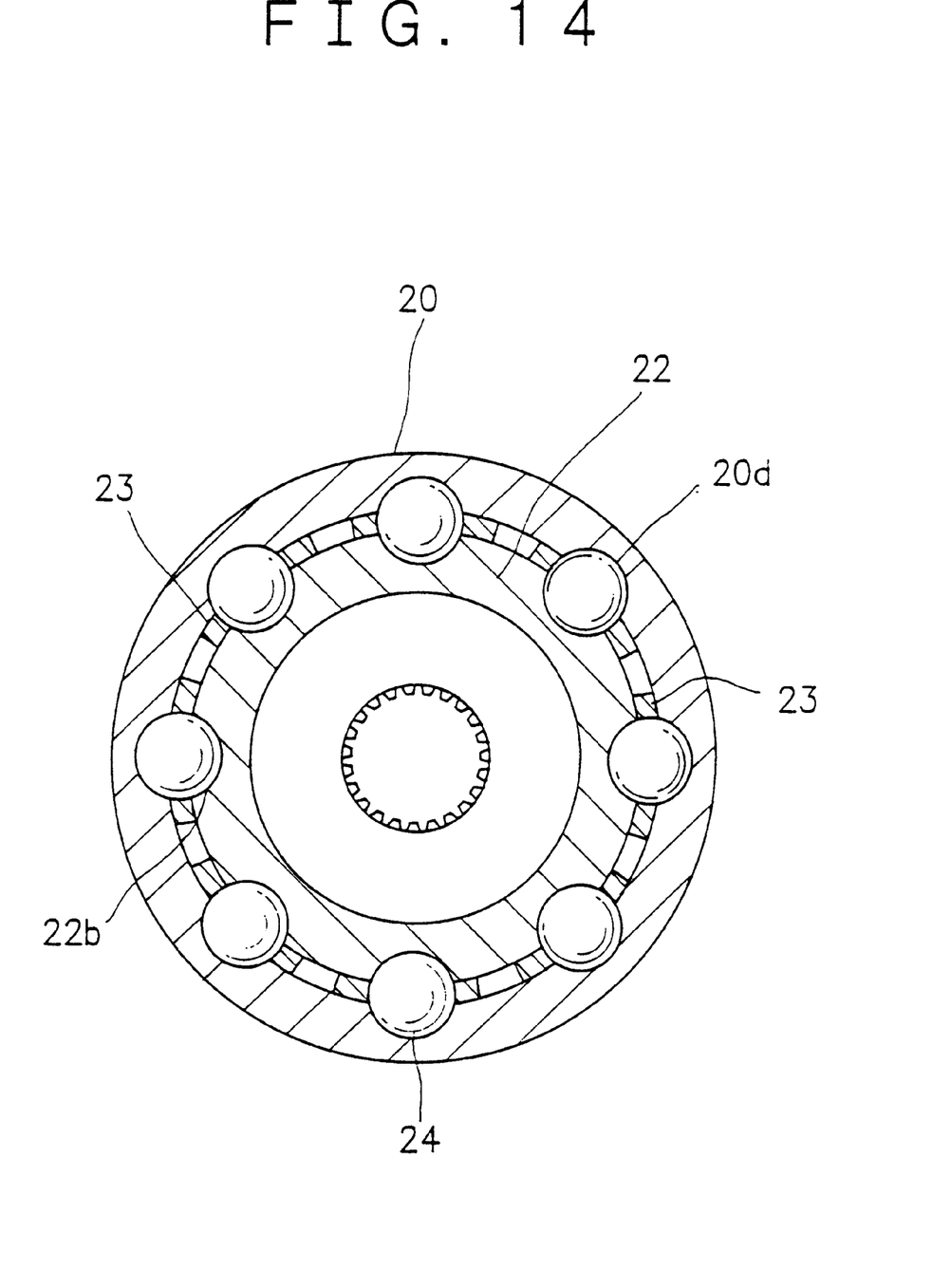
FIG. 14 is a sectional view taken along a line 14—14 of FIG. 13 and viewed from the direction of the arrow.
Figure 15:
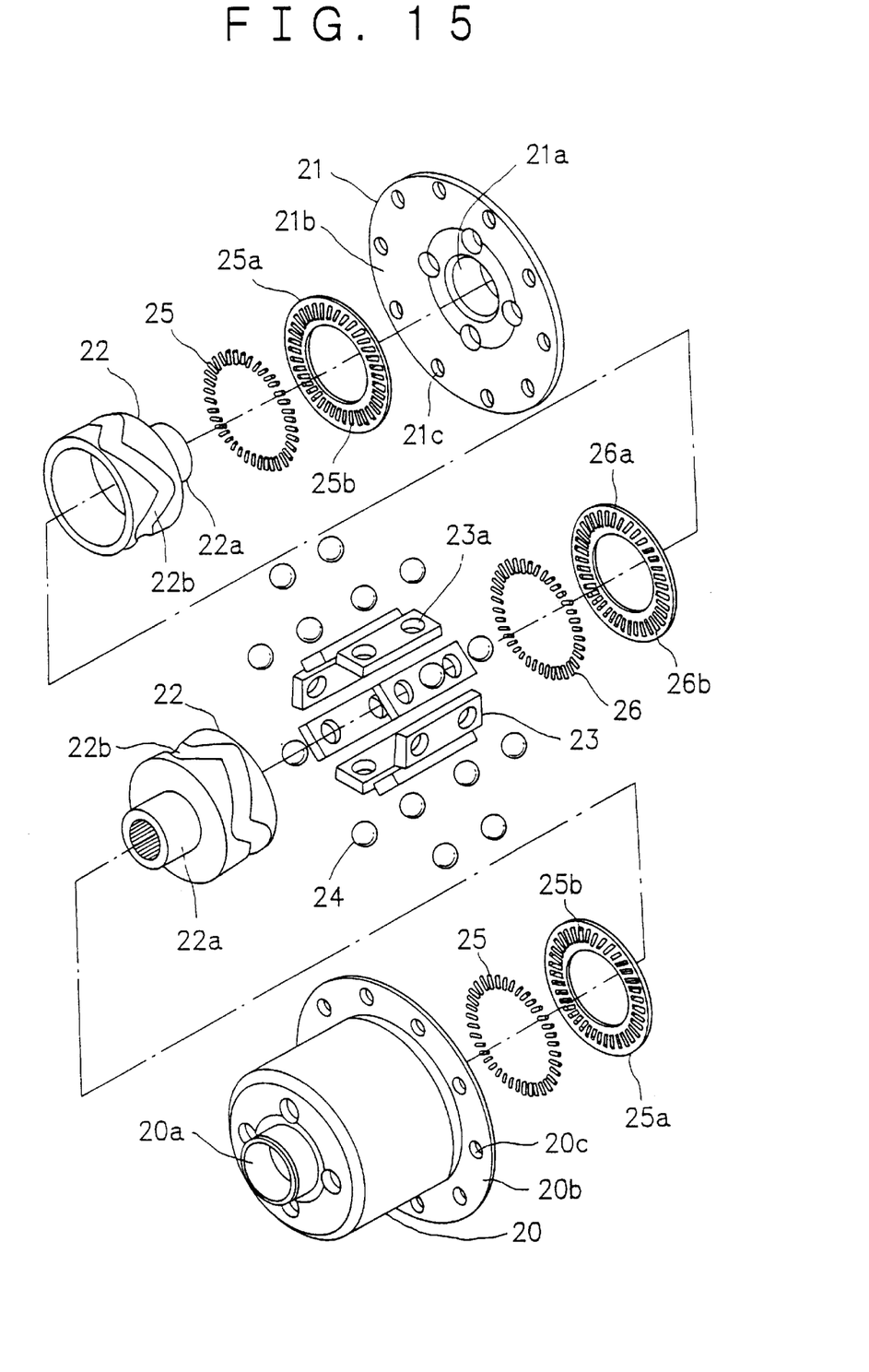
FIG. 15 is an exploded perspective view of the differential gear.

FIGS. 13 to 16 illustrate a third embodiment of the present invention, FIG. 13 being a side sectional view of the differential gear, FIG. 14 being a sectional view taken along the line 14—14 of FIG. 13 and viewed from the direction of arrow, and FIG. 15 being an exploded perspective view of the differential gear.

The differential gear of this embodiment comprises a gear case 20, a gear case cover 21 for closing one end of the gear case 20, a pair of ball disks 22 arranged coaxially with each other, a multiplicity of ball holders 23 interposed between the ball disks 22, a multiplicity of balls 24 held by the ball holders 23 in such a manner as to allow the balls 24 to freely roll, a multiplicity of rollers 25 arranged on the back side of the ball disks 22, and a multiplicity of rollers 26 interposed between the ball disks 22. An input side rotary element is constituted of the gear case 20, the gear case cover 21 and the ball holders 23. An output side rotary element is constituted of the ball disks 22.

The gear case 20 is of a tubular form having one open end and is provided at its center with a bearing 20a for supporting one of the ball disks 22. Around the gear case 20 there is provided a flange 20b which has a multiplicity of holes 20c for the insertion of bolts. The inner peripheral surface of the gear case 20 is provided with a multiplicity of grooves 20d for engaging the balls 24, the grooves 20d extending rectilinearly in the axial direction of the gear case 20 and circumferentially equally spaced apart from each other.

The gear case cover 21 is in the shape of a disk having at its center a bearing 22a for supporting the other of the ball disks 22. Around the gear case cover 21 there is formed a flange 21b which has a multiplicity of holes 21c for the insertion of bolts. That is, the gear case cover 21 is mounted to the gear case 20 by means of bolts, not shown, for fastening the flanges 20b and 21b together.

Figure 16:
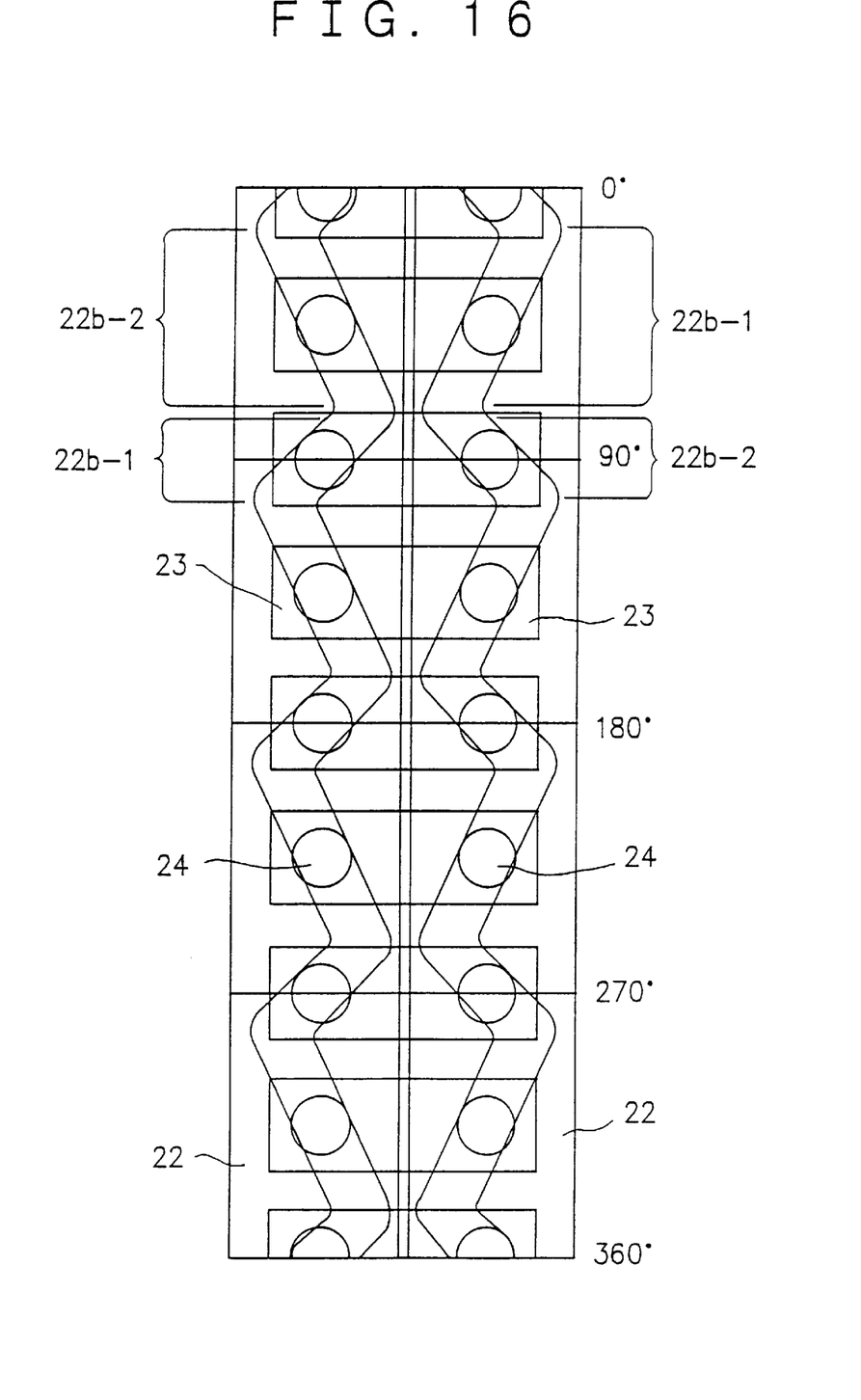
FIG. 16 is a development view of grooves.

The ball disks 22 are each of a cylindrical form having at one end a coupling portion 22a for coupling a drive shaft, not shown. The ball disks 22 have the same outer diameter and their respective confronting end faces. The outer peripheral surfaces of the ball disks 22 are provided with grooves 22b with which the balls 24 are engaged in a freely rolling manner, the grooves 22b being continuous in the circumferential direction. FIG. 16 is a planar development of the ball disks 22, in which angles 0 to 360 degrees indicate circumferential positions. That is, the grooves 22b alternately have a first guide segment 22b-1 in which the balls 24 are moved from a first axial side of the ball disk 22 toward the other side, and a second guide segment 22b-2 in which the balls 24 are moved from the other axial side of the ball disk 22 toward the first side, the first and second guide segments being continuous with each other. In the ball disk 22 on one hand, the first guide segment 22b-1 has a circumferential length greater than that of the second guide segment 22b-2, whereas in the ball disk 22 on the other hand, the second guide segment 22b-2 has a circumferential length greater than that of the first guide segment 22b-1. That is, like the second embodiment, the arrangement of the ball disks 22 is such that when the positions where the balls 14 are reversed coincide with each other on one side in the axial direction of the grooves 22b, then they are circumferentially shifted from each other on the other side.

The ball holders 23 is in the form of a plate extending from the peripheral surface of the ball disk 22 on one hand to the peripheral surface of the ball disk 22 on the other hand and is slidably disposed between the gear case 20 and the ball disks 22. Each of the ball holders 23 has a total of two holes 23a for receiving a ball 24 on one ball disk 22 and a ball 24 on the other ball disk 22, respectively, and reciprocates in the axial direction of the ball disks 22 while keeping the balls 24 on the respective ball disks 22 at certain intervals.

The balls 24 are received in the holes 23a of the ball holders 23 and are each engaged with both the groove 20d of the gear case 20 and the grooves 22b of the ball disks 22.

The rollers 25, 26 are each in the form of a cylinder extending uniformly in the axial direction and are held by annular cages 25a, 26a at certain circumferential intervals. The cages 25a and 26a are provided with a multiplicity of holes 25b and 26b, respectively, for receiving the rollers 25 and 26 in such a manner as to allow the rollers to freely roll. In the same manner as the first embodiment, the holes 25b, 26b are so arranged that the rolling axes of the rollers 25, 26 are inclined by a predetermined angle relative to a plane including the rotational axis of the gear body.

In the thus constructed differential gear, a ring gear, not shown, is mounted to the flange 20b of the gear case 20, for transmitting the driving force from the engine so as to rotate the entire gear around the axis of the gear case 20. That is, when a driving force is applied to the gear case 20, the ball holders 23 rotate integrally with the gear case 20, with the resultant rotational force being transmitted through the balls 24 to the grooves 22b of the ball disks 22 and further to the drive shaft not shown coupled to the ball disks 22.

When there occurs a difference in rotational speed between the ball disks 22, at that time the balls 24 are guided by the grooves 22b of the ball disks 22 and roll to reciprocate in the axial direction of the ball disks 22 along with the ball holders 23. Although in the construction of the first and second embodiments the thrust force acts in the same direction (direction of both ends of the rotational axis) in spite of different transmitting directions of driving force, in the construction of this embodiment the directions in which the thrust force acts will also differ when the driving forces are transmitted in different directions. More specifically, when a driving force is transmitted in one rotational direction, the balls 24 within the grooves 22b come into contact with the axially outer side of the ball disks 22, allowing the ball disks 22 to generate a thrust force toward the axially outer side, so that a frictional force is generated by the rollers 25 lying on the back side of the ball disks 22. On the contrary, when the driving force is transmitted in the other rotational direction, the balls 24 within the grooves 22b come into contact with the axially inner side of the ball disks 22, allowing the ball disks 22 to generate a thrust force toward the axially inner side, so that a frictional force is generated by the rollers 26 lying between the ball disks 22. Thus, by setting one of the rollers 25 and 26 to generate a larger frictional force and the other to generate a smaller frictional force, it is possible to obtain a different differential motion restricting force depending on the transmission direction of the driving force. In the case of e.g., a differential gear interposed between the front and rear wheels of the four-wheel drive vehicle, a secure operation of an anti-lock braking system will be ensured by reducing the differential motion restricting force upon deceleration to prevent the front and rear driving wheels from being mutually locked.

Although the present invention has been described in connection with certain preferred embodiments, it should be clear that various changes and modifications can be made without departing from the spirit and scope of the claimed invention.

What is claimed is:

1. A differential gear having an input side rotary element to be rotated by an external driving force, a pair of output side rotary elements arranged coaxially with the input side rotary element, and transmission means for transmitting a rotational force of the input side rotary element to the output side rotary element while permitting a difference in rotational speed between the output side rotary elements, said differential gear comprising:

a plurality of rollers interposed between axially confronting faces of said input side rotary element and at least one pair of output side rotary elements, said plurality of rollers when there occurs a difference in rotational speed between said pair of output side rotary elements being allowed to roll while being in contact with said confronting faces of said input and output side rotary elements; and a roller holder for holding said plurality of rollers at predetermine intervals in a freely rolling manner along a predetermined circumference around the rotational axes of said input side and output side rotary elements, wherein rolling axes of said rollers are inclined by predetermined angles relative to a radius such that said rollers impart frictional resistance to rolling between said input and output rotary elements, and wherein said rolling axes are inclined by predetermined angles relative to a plane including rotational axes of said input side and output side rotary elements.

2. A differential gear according to claim 1, wherein said plurality of rollers are arranged on a freely inclined manner so that an angle formed, when there occurs a difference in rotational speed between said output side rotational elements in one direction of rotation, between the rolling axes of said rollers and a plane including the rotational axes of said input side and output side rotary elements, is different from an angle formed, when there occurs a difference in rotational speed between said output side rotary elements in the other direction of rotation, between the rolling axes of said rollers and the plane including rotational axes of said input side and said output side rotary elements.

3. A differential gear having an input side rotary element to be rotated by an external driving force, a pair of output side rotary elements arranged coaxially with the input side rotary element, a plurality of rolling elements interposed between axially confronting faces of the output side rotary elements, and a holder element for holding the rolling elements between the outside rotary elements, said holder element having a plurality of elongated holes extending in the radial direction of the output side rotary elements and extending therethrough in the axial direction of the output side rotary elements, said plurality of elongated holes moveably receiving the rolling elements, said axially confronting faces of the output side rotary elements being provided with grooves with which the rolling elements are engaged, said grooves being continuous with each other in the circumferential direction of the output rotary elements, said differential gear comprising:

a plurality of rollers interposed between axially confronting faces of said input side rotary element and at least one pair of output side rotary elements, said plurality of rollers, when there occurs a difference in rotational speed between said pair of output side rotary elements, being allowed to roll while being in contact with said confronting faces of said input and output side rotary elements; and a roller holder for holding said plurality of rollers at predetermine intervals in a freely rolling manner along a predetermined circumference around the rotational axes of said input side and output side rotary elements, wherein rolling axes of said rollers are inclined by predetermined angles relative to a radius such that said rollers impart frictional resistance to rolling between said input and output rotary elements, and wherein said rolling axes are inclined by predetermined angles relative to a plane including rotational axes of said input side and output side rotary elements.

4. A differential gear according to claim 3, wherein said plurality of rollers are arranged in a freely inclined manner so that an angle formed, when there occurs a difference in rotational speed between said output side rotary elements in one direction of rotation, between the rolling axes of said rollers and a plane including the rotational axes of said input side and output side rotary elements, are different from an angle formed, when there occurs a difference in rotational speed between said output side rotary elements in the other direction of rotation, between the rolling axes of said rollers and the plane including rotational axes of said input side and output side rotary elements.

5. A differential gear having an input side rotary element to be rotated by an external driving force, a pair of output side rotary elements arranged coaxially with the input side rotary element, a plurality of rolling elements interposed between axially confronting faces of the input side rotary element and the output side rotary elements, and a holder element, arranged to be axially moveable between the radially confronting faces of the input side rotary element and the output side rotary elements, for holding in a freely rolling manner the rolling elements disposed in the axial direction of the output side rotary elements, said input side rotary element having a plurality of elongated holes extending in the axial direction of the output side rotary elements, said rolling elements moveably engaging said plurality of elongated holes, said confronting faces of the output side rotary elements and the input side rotary element being provided with grooves with which the rolling elements are engaged, and which are continuous with each other in the circumferential direction of the output side rotary elements, said differential gear comprising:

a plurality of rollers interposed between axially confronting faces of said input side rotary element and said pair of output side rotary elements and between axially confronting faces of said output side rotary elements, said plurality of rollers, when there occurs a difference in rotational speed between said pair of output side rotary elements, being allowed to roll while being in contact with said confronting faces of said input and output side rotary elements and with said confronting faces of said output side rotary elements; and a roller holder for holding said plurality of rollers at predetermine intervals in a freely rolling manner along a predetermined circumference around the rotational axes of said input side and output side rotary elements, wherein rolling axes of said rollers are inclined by predetermined angles relative to a radius such that said rollers impart frictional resistance to rolling between said input and output rotary elements, and wherein said rolling axes are inclined by predetermined angles relative to a plane including rotational axes of said input side and output side rotary elements.

6. A differential gear according to claim 5, wherein said plurality of rollers are arranged in a freely inclined manner so that an angle formed, when there occurs a difference in rotational speed between said output side rotary elements in one direction of rotation, between the rolling axes of said rollers and a plane including the rotational axes of said input side and output side rotary elements, are different from an angle formed, when there occurs a difference in rotational speed between said output side rotary elements in the other direction of rotation, between the rolling axes of said rollers and the plane including rotational axes of said input side and output side rotary elements.

* * * * *